Patented Mar. 29, 1938

2,112,258

UNITED STATES PATENT OFFICE 2,112,258

PREPARATION OF AMINO ANTHRAQUINONE COMPOUNDS

Richard S. Wilder, Hamburg, N. Y., assignor to National Aniline & Chemical Company, Incorporated, New York, N. Y.

No Drawing. Application July 22, 1936, Serial No. 92,024

18 Claims. (Cl. 260—60)

This invention relates to methods for the preparation of amino compounds of the anthraquinone series which are valuable as dyestuffs and as intermediates in the manufacture of dyestuffs.

It is an object of the invention to provide a method for the preparation of 1-alkylamino-4-hydroxyanthraquinone compounds.

A further object of the invention is to provide methods for the preparation of 1-alkylamino-4-aminoanthraquinone compounds and of unsymmetrical 1,4-di(alkylamino)anthraquinone compounds which methods are simple and economical in operation.

Other objects of the invention will in part be obvious and will in part appear hereinafter.

The invention accordingly comprises the several steps and relation and order of one or more of such steps with respect to each of the others, which are exemplified in the following detailed disclosure, and the scope of the application of which will be indicated in the claims.

It is known that 1-arylamino-4-hydroxyanthraquinone compounds may be prepared by reacting an arylamine (e. g., aniline) with leuco quinizarine in molecular proportions to produce a leuco 1-arylamino-4-hydroxyanthraquinone compound which can be recovered as such or oxidized to the corresponding anthraquinone compound. It is also known that symmetrical 1,4-di(arylamino)-anthraquinone compounds may be produced by condensing two molecular proportions of a suitable arylamine with leuco quinizarine, whereby a leuco 1,4-di(arylamino)-anthraquinone compound, which can be oxidized in a similar manner to the corresponding anthraquinone compound is produced. When attempting to employ this general process for the preparation of 1-amino-4-hydroxyanthraquinone or 1-alkylamino-4-hydroxyanthraquinone compounds by condensing leuco quinizarine with one molecular proportion of ammonia or of methylamine or of monoethanolamine, however, it has been found that the process is substantially inoperative for this purpose, since a product is obtained consisting mostly of a disubstituted anthraquinone in which both hydroxyl radicals have been replaced by the amino or the substituted amino groups.

It has been discovered in accordance with the present invention, however, that when a primary alkylamine containing at least two carbon atoms in a hydrocarbon radical (e. g., a primary alkylamine in which the alkyl group is an aliphatic hydrocarbon radical or a primary alkylamine in which the alkyl group is an aralkyl hydrocarbon radical) is subjected to a condensation treatment with a leuco 1,4-dihydroxyanthraquinone compound (e. g., leuco quinizarine) in at least equimolecular proportions, under mild reaction conditions, the said amine substantially completely replaces one hydroxyl group in the anthraquinone nucleus without affecting the other hydroxyl group; resulting in the formation of a leuco 1-alkylamino-4-hydroxyanthraquinone compound to the practical exclusion of the 1,4-dialkylamino product. The leuco 1-alkylamino-4-hydroxyanthraquinone compound may be recovered as such from the reaction mass, or it may first be oxidized to its corresponding quinoid form before recovery.

It has further been discovered in accordance with the present invention that the 1-alkylamino-4-hydroxyanthraquinone compound in the leuco form can be condensed with ammonia or with a primary alkylamine which may be unsubstituted or may contain substituents, but which is different from the amine employed to replace the first hydroxyl group, whereby the second hydroxyl group is replaced by an amino group or by the residue of the alkylamine, and a leuco 1-alkylamino-4-aminoanthraquinone or a leuco 1,4-di(alkylamino)anthraquinone compound in which the amino groups in the 1- and 4-positions of the anthraquinone nucleus are different, is respectively formed. As a part of the present invention, it has further been found that the second amination can be accomplished without separating the leuco 1-alkylamino-4-hydroxyanthraquinone compound from the reaction mass of the first amination. If desired, however, the compound may be separated from the reaction mass of the first amination prior to the second amination. Where this separation is effected, it has been found that it can be done without first oxidizing the leuco 1-alkylamino-4-hydroxyanthraquinone compound to the quinoid form. This is of advantage since, if the leuco 1-aminated-4-hydroxyanthraquinone compound were oxidized prior to separation, and it were desired to convert it to a 1-alkylamino-4-aminoanthraquinone or to a 1,4-di(alkylamino)anthraquinone compound, it would be necessary to reduce it again to the leuco form prior to the second amination.

The 1-alkylamino-4-hydroxyanthraquinone compounds, the 1-alkylamino-4-aminoanthraquinone compounds, and the 1,4-di(alkylamino)-anthraquinone compounds prepared in accordance with the foregoing procedure are valuable materials for coloring phenolformaldehyde resins, and materials containing or composed of organic derivatives of cellulose, such as, for example, cellulose acetate.

A leuco 1-alkylamino-4-hydroxyanthraquinone compound may be prepared in accordance with one embodiment of the process of the present invention by preparing a mixture containing a leuco 1,4 - dihydroxyanthraquinone compound (which may be obtained in any desired or suitable manner, many of which are well known in the art), a primary alkylamine containing at least two carbon atoms in a single hydrocarbon radical, and a solvent such as an alcohol, e. g., methyl alcohol (which mixture may or may not contain water). The proportions of the materials making up this mixture may be varied, but it has been found in accordance with the present invention, in order to carry out the reaction in a manner so as to produce a commercially important yield of the desired leuco 1-alkylamino-4-hydroxyanthraquinone compound, that the primary alkylamine should be in at least equimolecular proportions with respect to the leuco 1,4-dihydroxyanthraquinone compound, and that the primary alkylamine should be in low concentration with respect to the total mixture. The mixture is then heated, preferably at a relatively low temperature, e. g., from about 60° C. to about 100° C., under atmospheric or superatmospheric pressure for a period of time sufficient to cause a condensation to be effected between the leuco 1,4-dihydroxyanthraquinone compound and the amine. The product resulting from the condensation reaction comprises a leuco 1-alkylamino-4-hydroxyanthraquinone compound in which the residue of the amine has replaced one of the hydroxyl groups of the 1,4-dihydroxyanthraquinone compound.

Where this process is not to be employed as part of a method for the preparation of a 1-alkylamino-4-aminoanthraquinone or a 1,4-di(alkylamino)anthraquinone compound, or, if such compound is to be prepared, this is to be done by first separating the 1 - alkylamino-4 - hydroxyanthraquinone compound from the first amination reaction mass after completion of the reaction between the alkylamine and the leuco 1,4-dihydroxyanthraquinone compound, the leuco 1-alkylamino-4-hydroxyanthraquinone compound may be recovered as such from the reaction solution. This may be accomplished by cooling the mass to form a precipitate of the leuco compound, filtering off the precipitate from the remainder of the solution, and washing the precipitate with a suitable solvent, such as, for example, methyl alcohol. If desired, the leuco compounds prepared in accordance with the above procedure may be further purified by recrystallizing them from an organic solvent, such as, for example, toluene. They then may be converted to the quinoid form by oxidation with a suitable oxidizing agent, if desired. In certain cases, it may be found desirable to oxidize the leuco 1-alkylamino-4-hydroxyanthraquinone compounds to the quinoid form prior to separating them from the reaction mass of the first amination. Where the process of the invention is operated for the production of 1-alkylamino-4-hydroxyanthraquinone compounds, however, it is generally preferable to separate such compounds from the reaction mass in the leuco form because of the considerable solubility of the oxidized products in organic solvents.

As will be evident from the foregoing description, the amines employed for the replacement of the first hydroxyl group of the anthraquinone nucleus in accordance with the present invention may be of varied character. For example, they may be primary aliphatic amines in which the alkyl group contains two or more carbon atoms in an aliphatic hydrocarbon chain, such as ethylamine, amylamine, laurylamine, acetylamine, etc.; or primary aralkylamines, such as benzylamine, phenylethylamine, cuminylamine, and diphenylmethylamine.

Also, while in the above description, reactions have been described in which leuco quinizarine is mentioned as an example of a 1,4-dihydroxyanthraquinone compound, other leuco 1,4-dihydroxyanthraquinone compounds which contain substituents that do not adversely affect the amination reaction may be employed in an analogous manner for the preparation of similar products. As examples of substituted 1,4-dihydroxyanthraquinone compounds which may be employed in accordance with the present invention, there may be mentioned the following: 1,4,5,8- and 1,4,7,8-tetrahydroxyanthraquinone, 1,4,5 - trihydroxyanthraquinone, 1,4-dihydroxyanthraquinone-6-carboxylic acid ethyl or methyl esters, 1,4-dihydroxy-6-chloroanthraquinone, 1,4 - dihydroxy-5-aminoanthraquinone, etc. Where, in the specification and claims, 1,4-dihydroxyanthraquinone compounds are referred to, it will be understood that this expression is intended to include such substituted anthraquinone compounds.

The leuco 1-alkylamino-4-hydroxyanthraquinone compounds prepared in accordance with the process of the present invention are relatively stable. They are sparingly soluble in cold methyl alcohol, and, because of this property, where methyl alcohol is employed as the solvent, may be efficiently recovered from the reaction mixtures in which they are formed. When it is desired to convert them into the quinoid form, this may be accomplished by subjecting them to the action of oxidizing agents, either before or after their separation from the reaction solution. While various types of oxidation procedures may be used in the oxidation of the leuco alkylamino-4-hydroxyanthraquinones in accordance with the invention, the oxidizing agent to be employed for the oxidation of a particular leuco 1-alkylamino-4-hydroxyanthraquinone compound is dependent upon the character of the compound. It has been found that the stability of the compounds toward oxidizing agents varies with the number of carbon atoms in the alkylamino group in the 1-position in the compounds. For example, leuco 1-ethylamino-4-hydroxyanthraquinone can be oxidized to its quinoid form with nitrobenzene in alcohol solution, but leuco 1-monoalkylamino-4-hydroxyanthraquinone compounds containing five or more carbon atoms in the alkyl group (as, for example, leuco amylamino-4-hydroxyanthraquinone and leuco 1-mono-aralkylamino-4-hydroxyanthraquinone compounds) require more vigorous oxidation, for example, oxidation with a strong inorganic oxidizing agent, or with an organic nitro compound in the presence of an alkali.

The 1 - alkylamino - 4 - hydroxyanthraquinone compounds prepared in accordance with the procedure described above are violet crystalline solids which are soluble in organic solvents. In general, the solubility of these compounds in such solvents increases with increase in the number of carbon atoms in the alkyl radical of the substituent alkylamino group.

The solutions of the 1-alkylamino-4-hydroxyanthraquinone compounds in organic solvents are sensitive to alkalies; the color of such solutions being changed to a bluer shade. These compounds in the form of dispersions directly dye phenol-formaldehyde resins and materials, and fibers composed of organic derivatives of cellulose, violet shades which, in general, tend to become bluer as the carbon content of the alkyl radical of the substituted alkylamino group in the anthraquinone compound increases.

The preparation of 1,4-di(alkylamino)anthraquinone compounds in accordance with the present invention is preferably carried out without separating the leuco 1-alkylamino-4-hydroxyanthraquinone compounds from the solutions in which they are formed. In proceeding in this way, the alkylamine whose residue it is desired to substitute in the 4-position of the anthraquinone nucleus, and which is different from the amine employed for the first amination, is introduced into the first amination reaction solution, preferably in the form of an aqueous solution, and the resulting mixed solution is heated for a sufficient period of time to cause the replacement of the hydroxyl group in the 4-position by the residue of the amine. To separate the thus prepared leuco 1,4-di(alkylamino)anthraquinone compound from the alcoholic condensation mixture, it is advisable first to oxidize it to the corresponding quinoid form in view of the considerable solubility of the leuco compounds in the condensation mixtures. In this connection, it has been observed the leuco 1,4-di(alkylamino)anthraquinone compounds are much harder to oxidize when the substituent alkyl groups are of low carbon content than when the alkyl groups are of high carbon content. Thus, leuco 1-ethylamino-4-methylaminoanthraquinone requires somewhat vigorous oxidation with an organic nitro compound for rapid and complete conversion to its quinoid form, while leuco 1-amylamino-4-methylaminoanthraquinoine may be readily oxidized to its quinoid form with air.

The amino compound employed in the second amination may be ammonia or it may be an unsubstituted alkylamine or an alkylamine containing substituents such as, for example, hydroxyl, amino, halogen, or alkoxy groups. As examples of alkyl amines which may be employed in this connection, may be mentioned methylamine, ethylenediamine, ethanolamine, etc.

The unsymmetrical 1,4-di(alkylamino)anthraquinone compounds prepared in the foregoing manner are soluble in organic solvents to form solutions which are blue in shade and tend to become greener as the number of carbon atoms in the substituent alkyl groups increases. In the form of dispersions, they dye phenol-formaldehyde resins and materials made of organic derivatives of cellulose deep blue to green-blue shades.

For a better understanding of the invention, reference should be had to the following specific examples wherein are described and illustrated preferred methods of producing 1-alkylamino-4-hydroxyanthraquinone compounds and unsymmetrical 1,4-di(alkylamino)anthraquinone compounds; but it is to be understood the invention is not limited thereto. The parts are by weight and temperatures are in degrees centigrade.

*Example 1, Part I.*—A mixture of 50 parts of leuco quinizarine (obtained for example, by reduction of an aqueous suspension of quinizarine in neutral or slightly alkaline solution with sodium hyposulfite at 60 to 80°), 325 parts of methyl alcohol and 50 parts of a 33 per cent aqueous solution of monoethylamine is agitated and boiled vigorously for one hour in a flask fitted with a suitable reflux condenser. The resulting condensation product which is formed in the mixture is mainly the leuco derivative of 1-mono-ethylamino-4-hydroxyanthraquinone.

*Part II.*—20 parts of nitrobenzene are added to the condensation mixture which is then boiled under reflux for about two hours, and thereafter cooled to about 30° whereby 1-mono-ethylamino-4-hydroxyanthraquinone is precipitated. The mixture is filtered and the residue on the filter, which is 1-mono-ethylamino-4-hydroxyanthraquinone, is washed with about 120 parts of methyl alcohol and then dried in air or vacuo.

The dry 1-mono-ethylamino-4-hydroxyanthraquinone thus obtained is a dark, reddish-blue crystalline compound. It colors materials made of cellulose esters or ethers, and phenol-formaldehyde resins, a clear violet. The shade obtained on cellulose acetate which is dyed with 1-mono-ethylamino-4-hydroxyanthraquinone is very much redder than that produced by 1,4-di(ethylamino)anthraquinone.

By substituting amylamine or cetylamine for the ethylamine of the above example, it is possible to prepare leuco 1-amylamino-4-hydroxyanthraquinone or leuco 1-cetylamino-4-hydroxyanthraquinone respectively, and by oxidizing the said leuco compounds, the corresponding anthraquinone compounds are obtained.

*Example 2.*—30 parts of a 38 per cent aqueous solution of mono-methylamine are added to the mixture resulting from the process of Example I, Part I, and the mixture is boiled for about one and a half hours. The condensing reaction results in the formation of leuco 1-mono-ethylamino-4-mono-methylaminoanthraquinone. To convert the leuco compound into its corresponding quinoid form, 20 parts of nitrobenzene are added to the mixture which is then boiled for a further two hours and then cooled to about 30°, whereby 1-mono-ethylamino-4-mono-methylaminoanthraquinone is precipitated. The mixture is filtered; and the crystalline residue on the filter is washed with about 120 parts of methyl alcohol and then is dried in air or vacuo.

The dry product which is mainly 1-mono-ethylamino-4-mono-methylaminoanthraquinone is a dark blue crystalline solid which is insoluble in water and in aqueous alkaline solutions. It is sparingly soluble in cold alcohol and readily soluble in organic solvents, such as chlorbenzene, nitrobenzene, toluene, xylene, etc., to form deep blue solutions which do not change color upon the addition thereto of alkalis. The compound dissolves readily in concentrated sulfuric acid to form a brown solution which, upon gradual dilution with water, changes to a red solution and finally deposits the 1-mono-ethylamino-4-mono-methylaminoanthraquinone in the form of fine blue crystals. The compound dyes cellulose acetate a strong, clear shade of blue of excellent fastness to light.

*Example 3.*—A mixture of 100 parts of leuco quinizarine, 300 parts of methyl alcohol and 45 parts of mono-amylamine is agitated vigorously and boiled for two hours in a flask fitted with a reflux condenser. 50 parts of a 38 per cent solution of mono-methylamine are then added and the mixture is boiled thereafter for about one and one-half hours. The leuco derivative of 1-mono-amylamino-4-mono-methylaminoanthraquinone is thus formed. The mixture is cooled, and the leuco compound which is quite soluble in the mixture is oxidized to the insoluble 1-mono-amylamino-4-mono-methylaminoanthraquinone by passing a stream of air through the mixture for about eight hours, or until oxidation is complete. As oxidation proceeds, the color of the mixture changes from yellowish-brown to green, and finally to blue as the crystalline 1-mono-amylamino-4-mono-methylaminoanthraquinone separates. The mixture is filtered; the crystalline residue is washed with about 120 parts of methyl alcohol, then with a hot aqueous solution of alkali carbonates, and finally with hot water. The washed cake is dried in air or vacuo.

The dry product thus obtained, which is 1-mono-amylamino-4-mono-methylaminoanthraquinone, is a bronzy, soft crystalline substance which dissolves readily in organic solvents, such as, chlorbenzene, nitrobenzene, toluene, xylene, etc., to form blue solutions which are slightly greener in shade than corresponding solutions of the 1-mono-ethylamino-4-mono-methylaminoanthraquinone of Example 2. It dissolves in alcohol to form blue solutions which do not change in shade on addition thereto of alkali. It dissolves readily in concentrated sulfuric acid to form a solution which upon gradual dilution with water becomes red and finally deposits 1-mono-amylamino-4-mono-methylaminoanthraquinone in the form of blue crystals. The compound can be purified by crystallizing it from its toluene solution which deposits the 1-mono-amylamino-4-mono-methylaminoanthraquinone as fine, blue, soft, needle-like crystals. The compound dyes materials made of cellulose esters and ethers and phenol-formaldehyde resins greenish-blue shades of very good fastness to light. The shades obtained on cellulose ester products with 1-mono-amylamino-4-mono-methylaminoanthraquinone are somewhat greener than those obtained with the 1-mono-ethylamino-4-mono-methylaminoanthraquinone of Example 2.

By substituting ammonia (40 parts of a 28 percent aqueous solution) for the monomethylamine used in the above example, and subsequently oxidizing the resulting leuco compound, there may be obtained 1-mono-amylamino-4-aminoanthraquinone which dyes cellulose acetate blue-violet shades.

*Example 4.*—A mixture of 50 parts of leuco quinizarine, 25 parts of benzylamine and 325 parts of methyl alcohol is vigorously agitated and boiled for about 15 minutes. The mixture becomes a magma of crystals of the leuco compound of 1-mono-benzylamino-4-hydroxyanthraquinone. The compound can be separated at this point by filtration, the compound being obtained as a cake of fine red crystals which are very slightly soluble in alcohol, and do not oxidize readily in air. The leuco compound may, if desired, be oxidized to the corresponding anthraquinone compound which is a valuable product.

To produce an unsymmetrical 1,4-diaminated product, the magma of crystals is thinned by addition thereto of 50 parts of a 40 per cent aqueous solution of mono-methylamine and is boiled under reflux for about one-half hour. To convert the thus formed leuco 1-mono-benzylamino-4-mono-methylaminoanthraquinone into its quinoid form, 20 parts of nitrobenzene are added to the mixture which is then boiled for about one-half hour and cooled to about 30°. The resulting slurry of crystals is filtered, the filter cake is washed on the filter with about 160 parts of methyl alcohol and dried in air or vacuo.

The dry compound which is mainly 1-mono-benzylamino-4-mono-methylaminoanthraquinone is a dark blue crystalline powdery substance which dissolves in organic solvents, such as chlorbenzene, nitrobenzene, toluene, xylene, etc. to form dark-blue solutions. It dissolves in concentrated sulfuric acid to form a brown solution which upon gradual dilution with water turns red and finally deposits the 1-mono-benzylamino-4-mono-methylaminoanthraquinone in the form of hard, blue crystals.

It dyes cellulose acetate a bright, clear blue of very good fastness to light.

By substituting an equivalent quantity of mono-ethanolamine for the mono-methylamine used in this example, and subsequently oxidizing the resulting leuco-body, there may be obtained 1-benzylamino-4-ethanolaminoanthraquinone which dyes cellulose acetate or phenol-formaldehyde resins blue shades.

It will be understood the above specific examples are merely illustrative of the invention and that other 1-alkylamino-4-hydroxyanthraquinone, 1-alkylamino-4-aminoanthraquinone, and unsymmetrical 1,4-di(alkylamino)anthraquinone compounds may be prepared in an analogous manner by employing other 1,4-dihydroxyanthraquinone compounds, such as, for example, 1,4-dihydroxyanthraquinone compounds which contain other substituents, in place of quinizarine; other primary alkylamines containing at least two carbon atoms in a single hydrocarbon radical for the replacement of the first hydroxyl group in the 1,4-dihydroxyanthraquinone compound; and ammonia or other alkylamines different from the aforesaid amines, to replace the second hydroxyl group.

Furthermore, it will be understood the conditions of operation described in the examples, while representative of preferred practice, may be varied, if desired. For example, the leuco 1,4-dihydroxyanthraquinone compound and the alkylamine employed for the first amination may be reacted in molecular proportions. However, to assure that the reaction goes substantially to completion, it is preferable to use an amount of the alkylamine such that there will be an excess of this compound present. Thus, there may be employed from about one mol. to about five mols of the alkylamine for each mol. of the 1,4-dihydroxyanthraquinone compound.

The reaction between a primary alkylamine and a leuco 1,4-dihydroxyanthraquinone compound in accordance with the process of the present invention is carried out under relatively mild reaction conditions. By proceeding in this manner, it has been found possible to avoid the formation of practically important quantities of asymmetrical 1,4-di(alkylamino)anthraquinone compound. Thus, it has been found the concentration of the primary alkylamine in the reaction solution should be low, and, in general, should not exceed 15 per cent by weight of the solution. Further, it is preferred to heat the reaction solution at a relatively low temperature, e. g., from about 60° C. to about 100° C., and to carry on the heating for a relatively short period of time, for example, from about one-half hour to about three hours, although in some instances, an even shorter period of time has been found to be sufficient. It will be understood the concentrations, temperatures, and times employed in carrying out this reaction are dependent factors, but, in general, for preferred operation should fall within the foregoing limits. In carrying out the reaction between a 1-alkylamino-4-hydroxyanthraquinone compound and ammonia, or an alkylamine different from the alkylamine corresponding to the alkylamino group in the 1-position of the anthraquinone nucleus, in general, the conditions maintained may be substantially the same as those employed in the first amination.

While in most instances it has been found the reaction proceeds in optimum manner when an alcohol, such as, for example, methyl, ethyl, propyl, or butyl alcohol is employed in the reaction, other solvents, such as, for example, water, benzene, toluene, or, in general, any solvent inert to the reacting materials may also be employed with substantially equivalent results.

Since, in carrying out the above process, changes may be made without departing from the scope of the invention, it is intended that all matter contained in the above description shall be interpreted as illustrative and not in a limiting sense.

I claim:

1. A process for the preparation of anthraquinone condensation products which comprises reacting a leuco 1,4-dihydroxyanthraquinone compound with a primary alkylamine containing at least two carbon atoms in a hydrocarbon radical under conditions adapted to form predominantly a leuco 1-alkylamino-4-hydroxyanthraquinone compound.

2. A process for the preparation of anthraquinone condensation products which comprises reacting a leuco 1,4-dihydroxyanthraquinone compound with a primary alkylamine containing at least two carbon atoms in a hydrocarbon radical under conditions adapted to form predominantly a leuco 1-alkylamino-4-hydroxyanthraquinone compound, and oxidizing the leuco 1-alkylamino-4-hydroxyanthraquinone compound to the corresponding anthraquinone compound.

3. A process for the preparation of anthraquinone condensation products which comprises reacting a leuco 1,4-dihydroxyanthraquinone compound with a primary alkylamine containing at least two carbon atoms in a hydrocarbon radical under conditions adapted to form predominantly a leuco 1-alkylamino-4-hydroxyanthraquinone compound, and recovering the leuco 1-alkylamino-4-hydroxyanthraquinone compound.

4. A process for the preparation of anthraquinone condensation products which comprises reacting a leuco 1,4-dihydroxyanthraquinone compound with at least one molecular proportion of a primary alkylamine containing at least two carbon atoms in a hydrocarbon radical under mild reaction conditions, to form a leuco 1-alkylamino-4-hydroxyanthraquinone compound.

5. A process for the preparation of anthraquinone condensation products which comprises heating a mixture comprising a leuco 1,4-dihydroxyanthraquinone compound and at least one molecular proportion of a primary alkylamine containing at least two carbon atoms in an aliphatic hydrocarbon radical under conditions adapted to form predominantly a leuco 1-alkylamino-4-hydroxyanthraquinone compound.

6. A process for the preparation of anthraquinone condensation products which comprises heating a mixture comprising a leuco 1,4-dihydroxyanthraquinone compound, at least one molecular proportion of a primary alkylamine containing at least two carbon atoms in a hydrocarbon radical, and an inert solvent, said primary alkylamine comprising not over 15 per cent by weight of the mixture, at a temperature between about 60° and about 100° C. for a period of time, not in excess of about three hours, sufficient to cause a condensation to take place between said leuco 1,4-dihydroxyanthraquinone compound and said primary akylamine, whereby a leuco 1-alkylamino-4-hydroxyanthraquinone compound is produced.

7. A process for the preparation of anthraquinone condensation products which comprises reacting a leuco 1,4-dihydroxyanthraquinone compound with a primary alkylamine containing at least two carbon atoms in a hydrocarbon radical and then with a compound selected from the group consisting of ammonia and primary alkylamines different from the aforesaid amine, whereby a leuco 1,4-diaminated anthraquinone compound is produced.

8. A process for the preparation of anthraquinone condensation products which comprises reacting a leuco 1,4-dihydroxyanthraquinone compound with at least one molecular proportion of a primary alkylamine containing at least two carbon atoms in a hydrocarbon radical under mild reaction conditions, to form a mixture containing a leuco 1-alkylamine-4-hydroxyanthraquinone compound, adding to said mixture a compound selected from the group consisting of ammonia and primary alkylamines different from the aforesaid amine, and heating the resulting mixture to produce a leuco 1,4-diaminated anthraquinone compound.

9. A process for the preparation of anthraquinone condensation products which comprises reacting a leuco 1,4-dihydroxyanthraquinone compound with at least one molecular proportion of a primary alkylamine containing at least two carbon atoms in a hydrocarbon radical under mild reaction conditions, to form a mixture containing a leuco 1-alkylamino-4-hydroxyanthraquinone compound, adding to said mixture a compound selected from the group consisting of ammonia and primary alkylamines different from the aforesaid amine, heating the resulting mixture to produce a leuco 1,4-diaminated anthraquinone compound, and oxidizing said leuco 1,4-diaminated anthraquinone compound to the corresponding anthraquinone compound.

10. A process for the preparation of anthraquinone condensation products which comprises reacting a leuco 1,4-dihydroxyanthraquinone compound with at least one molecular proportion of a primary alkylamine containing at least two carbon atoms in a hydrocarbon radical under mild reaction conditions, to form a mixture containing a leuco 1-alkylamino-4-hydroxyanthraquinone compound, adding to said mixture a compound selected from the group consisting of ammonia and primary alkylamines different from the aforesaid amine, heating the resulting mixture, to produce a leuco 1,4-diaminated anthraquinone compound, and recovering said leuco 1,4-diaminated anthraquinone compound.

11. A process for the preparation of anthraquinone condensation products which comprises reacting a leuco 1,4-dihydroxyanthraquinone compound with at least one molecular proportion of a primary alkylamine containing at least two carbon atoms in a hydrocarbon radical under mild reaction conditions, to form a mixture containing a leuco 1-alkylamino-4-hydroxy-anthraquinone compound, adding to the mixture a primary alkylamine different from the aforesaid amine, heating the resulting mixture, to form a leuco 1,4 - di (alkylamino) anthraquinone compound, oxidizing the leuco 1,4-di(alkylamino) anthraquinone compound to the corresponding anthraquinone compound, and recovering the anthraquinone compound.

12. A process for the preparation of anthraquinone condensation products which comprises heating a mixture comprising a leuco 1,4-dihydroxyanthraquinone compound, at least one molecular proportion of a primary alkylamine containing at least two carbon atoms in an aliphatic hydrocarbon radical, and an inert solvent, said primary alkylamine comprising not over 15 per cent by weight of the mixture, at a temperature between about 60° C. and about 100° C. for a period of time not in excess of about three hours sufficient to cause a condensation to take place between said leuco 1,4-dihydroxyanthraquinone compound and said primary alkylamine, whereby a leuco 1 - alkylamino - 4 - hydroxyanthraquinone is produced, heating a mixture comprising said leuco 1-alkylamino-4-hydroxyanthraquinone compound and a compound selected from the group consisting of ammonia and primary alkylamines different from said primary alkylamine, to form a leuco 1,4-diaminated anthraquinone compound, oxidizing said leuco 1,4-diaminated anthraquinone compound to the corresponding anthraquinone compound, and recovering said corresponding anthraquinone compound.

13. A process for the preparation of anthraquinone condensation products which comprises heating a mixture comprising a leuco 1,4-dihydroxyanthraquinone compound, at least one molecular proportion of a primary alkylamine containing at least two carbon atoms in an aliphatic hydrocarbon radical, and an inert solvent, said primary alkylamine comprising not over 15 per cent by weight of the mixture, at a temperature between about 60° C. and about 100° C. for a period of time not in excess of about three hours sufficient to cause a condensation to take place between said leuco 1,4-dihydroxyanthraquinone compound and said primary alkylamine, and form in the mixture a leuco 1-alkylamino-4-hydroxyanthraquinone compound, adding to the mixture a primary alkylamine different from said first-mentioned primary alkylamine, heating the resulting mixture for a period of time sufficient to cause a condensation to take place between said leuco 1-alkylamino-4-hydroxyanthraquinone compound and said last-mentioned primary alkylamine and form a leuco 1,4-di(alkylamino)-anthraquinone compound, oxidizing the leuco 1,4-di(alkylamino)anthraquinone compound to the corresponding anthraquinone compound, and recovering said corresponding anthraquinone compound.

14. A process for the preparation of anthraquinone condensation products which comprises reacting a leuco 1,4-dihydroxyanthraquinone compound with at least one molecular proportion of a primary alkylamine containing at least two carbon atoms in a hydrocarbon radical under mild reaction conditions, to form a mixture containing a leuco 1-alkylamino-4-hydroxyanthraquinone compound, adding to said mixture at least one molecular proportion of methylamine, heating the resulting mixture to cause a condensation to take place between the leuco 1-alkylamino-4-hydroxyanthraquinone compound and the methylamine and form a leuco 1-alkylamino-4-methylaminoanthraquinone compound, oxidizing the leuco 1-alkylamino-4-methylaminoanthraquinone compound to the corresponding 1-alkylamino-4-methylaminoanthraquinone compound, and recovering the 1-alkylamino-4-methylaminoanthraquinone compound.

15. A process for the preparation of an anthraquinone condensation product which comprises heating a mixture comprising leuco quinizarine, from one to five mols of ethylamine, and methyl alcohol, the ethylamine comprising not over 15 per cent by weight of the mixture, at a temperature from about 60° C. to about 100° C. for about one-half to about three hours, whereby leuco 1-ethylamino-4-hydroxyanthraquinone is produced, adding to the mixture containing the leuco 1-ethylamino-4-hydroxyanthraquinone at least one molecular proportion of methylamine, heating the resulting mixture for a period of time sufficient to cause a condensation to take place between the leuco 1-ethylamino-4-hydroxyanthraquinone and the methylamine and form leuco 1-ethylamino - 4 - methylaminoanthraquinone, oxidizing the leuco 1-ethylamino-4-methylaminoanthraquinone to 1-ethylamino-4-methylaminoanthraquinone, and recovering 1-ethylamino-4-methylaminoanthraquinone.

16. A process for the preparation of anthraquinone condensation products which comprises reacting a leuco 1-alkylamino-4-hydroxyanthraquinone compound in which the alkylamino group contains at least two carbon atoms in a hydrocarbon radical with a compound selected from the group consisting of ammonia and primary alkylamines having an alkyl radical different from the aforesaid radical, whereby a leuco 1,4-diaminated anthraquinone compound is produced.

17. A process for the preparation of anthraquinone condensation products which comprises reacting a leuco 1-alkylamino-4-hydroxyanthraquinone compound in which the alkylamino group contains at least two carbon atoms in a hydrocarbon radical with a primary alkylamine having an alkyl radical different from the aforesaid radical, whereby a leuco 1,4-di(alkylamino)-anthraquinone compound is produced.

18. A process for the preparation of anthraquinone condensation products which comprises reacting methylamine with a leuco 1-alkylamino-4-hydroxyanthraquinone compound in which the alkylamino group contains at least two carbon atoms in a hydrocarbon radical, whereby a leuco 1,4 - di - (alkylamino) anthraquinone compound is produced, oxidizing said leuco 1,4-di(alkylamino)anthraquinone compound to the corresponding 1,4-di(alkylamino)anthraquinone compound, and recovering said 1,4-di(alkylamino)-anthraquinone compound.

RICHARD S. WILDER.